(12) United States Patent  
Pawellek et al.

(10) Patent No.: US 6,483,221 B1
(45) Date of Patent: Nov. 19, 2002

(54) ELECTRIC MOTOR

(75) Inventors: Jürgen Pawellek, Unsleben (DE); Udo Schulz, Bad Neustadt (DE); Rolf Vollmer, Gersfeld (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 09/763,551
(22) PCT Filed: Sep. 13, 1999
(86) PCT No.: PCT/DE99/02890
§ 371 (c)(1),
(2), (4) Date: Feb. 21, 2001
(87) PCT Pub. No.: WO00/17986
PCT Pub. Date: Mar. 30, 2000

(51) Int. Cl.$^7$ .................................................. H02K 1/06
(52) U.S. Cl. ......................... 310/216; 310/217; 310/254
(58) Field of Search .......................... 310/216, 42, 217, 310/254, 257, 258; 29/596–598

(56) References Cited

U.S. PATENT DOCUMENTS

| | | | |
|---|---|---|---|
| 2,323,114 A | | 6/1943 | Bradford et al. |
| 4,364,169 A | * | 12/1982 | Kawano et al. ............... 29/596 |
| 4,538,345 A | * | 9/1985 | Diederichs .................... 29/596 |
| 5,075,150 A | * | 12/1991 | Webb et al. .................. 310/216 |
| 5,142,178 A | * | 8/1992 | Kloster et al. .............. 310/217 |

FOREIGN PATENT DOCUMENTS

| | | |
|---|---|---|
| DE | 18 82 073 | 11/1963 |
| DE | 32 03 123 A1 | 8/1983 |
| DE | 32 27 681 A1 | 2/1984 |
| DE | 34 18 069 A1 | 11/1985 |
| EP | 0 849 857 A | 6/1998 |
| JP | 63 224637 A | 9/1988 |
| JP | 01 303029 A | 12/1989 |
| JP | 04 372552 A | 12/1992 |
| JP | 05 003648 A | 1/1993 |

* cited by examiner

Primary Examiner—Tran Nguyen
(74) Attorney, Agent, or Firm—Henry M. Feiereisen

(57) ABSTRACT

A method of producing a laminated core of a stator of an electric motor, includes at least one laminated core of a stator formed by stacked sheet-metal laminates, which have mechanical individual poles and of poles connected in the circumferential direction of the stator, at least one pole shank and at least one pole shoe facing a rotor. The sheet-metal laminates are configured with indentations and protrusions and, as a result, the sheet-metal laminates form the laminated core of the stator by interengagement of the indentations and protrusions. The mechanical poles of the laminated core of the stator have windings, and webs are provided between the poles to connect the connected mechanical poles in the circumferential direction. The axial set-up of the sheet-metal laminates of the laminated core of the stator has a predeterminable alternating succession of poles with a connecting web and poles without a connecting web.

7 Claims, 4 Drawing Sheets

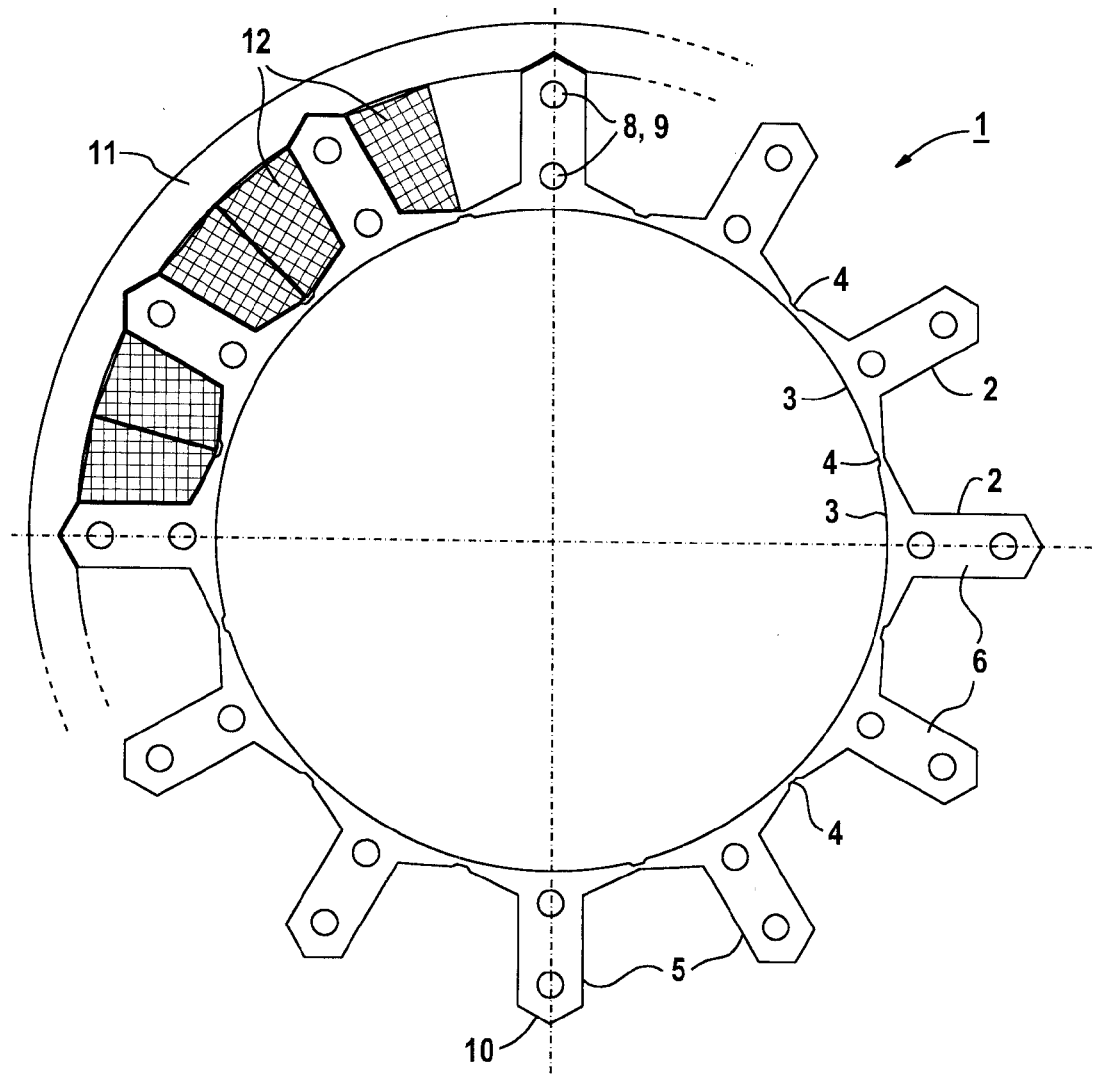
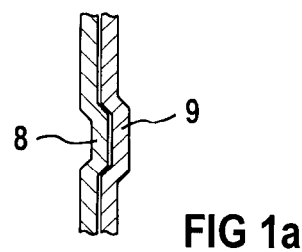
FIG 1
FIG 1a

ELECTRIC MOTOR

BACKGROUND OF THE INVENTION

The invention relates to a laminated core of a stator of an electric motor and a method of producing it.

Laminated iron cores serve for guiding the magnetic field.

German Utility Model 18 82 073 discloses a laminated actuating magnet, having sheet-metal laminates provided on one side with preferably circular indentations in such a way that protrusions are formed on its opposite side and the sheet-metal laminates can be fitted together by interengagement of their indentations and protrusions to form a laminated core for the actuating magnet.

It is difficult in this way to achieve an optimum alignment of the sheet-metal laminates for providing an acceptable mutual angular positioning, without impairing the magnetic properties and consequently the operating behavior of the electric motor. Furthermore, this causes problems when fitting the windings.

SUMMARY OF THE INVENTION

On this basis, it is an object of the invention to provide a structural configuration of a laminated core for a stator of an electric motor, by which the production can be simplified and reduced in cost and which at the same time achieves the magnetic properties of comparable electric motors.

This object is achieved by an electric motor which has the following features:
a) at least one laminated core of a stator formed by stacked sheet-metal laminates,
b) sheet-metal laminates comprising mechanical individual poles and poles which are connected in the circumferential direction of the stator, with at least one pole shank and at least one pole shoe facing a rotor,
c) indentations of the sheet-metal laminates in such a way that the opposite sides of the sheet-metal laminates have protrusions and, as a result, the sheet-metal laminates form the laminated core of the stator by interengagement of their indentations and protrusions,
d) windings of the magnetic poles of the laminated core of the stator,
e) webs between the poles which connect the connected mechanical poles in the circumferential direction,
f) the axial set-up of the sheet-metal laminates of the laminated core of the stator has a predeterminable alternating succession of poles with a connecting web and poles without a connecting web.

An electric motor of this type is produced by the following method:
a) production of the mechanical individual poles and/or the poles connected in the circumferential direction by stamping in a progressive die,
b) the sheet-metal laminates formed by stamping are assembled in a predeterminable sequence,
c) the pole shanks protruding essentially radially outward and/or inward are provided with pre-wound coils,
d) the entire laminated core of the stator is encapsulated and/or impregnated.

The laminated core according to the invention of a stator of an electric motor can be produced by a small number of simple method steps. Thus, this method can easily be automated. As a consequence of its optimized constructional design in comparison with conventional electric motors, the laminated core of the stator has comparable electromagnetic properties, so that no power losses of the electric motor are experienced. The laminated core of the stator, assembled in a predetermined sequence of the sheet-metal laminates, if need be with the assistance of a mounting mandrel, has pole shanks protruding inward (toward the air gap) or outward; this depends on whether the sheet-metal laminates of the connected poles are connected to one another at their outer circumference or their pole shoes.

These pole shanks are accordingly preferably provided with windings from the inside or outside. In this respect, windings of all forms, interconnections and types, such as for example a double-layer fractional-slot winding, can be used. The construction of the laminated core of the stator allows pole shoes preferably turned into tooth-wound coils to be fitted onto the pole shanks of the laminated core. In this arrangement, the tooth-wound coils can be positioned in virtually any way desired in the circumferential direction on the pole shanks to obtain desired motor properties, such as for example reduced torque ripple.

The fixing of the windings preferably takes place by encapsulating and impregnating the laminated core. In this way, not only the mechanical fixing and compacting of the laminated core is achieved but also an electrical insulation of the windings from one another. Similarly, as an alternative or additional measure, mechanical fixings of the windings, for example in the form of slot wedges and/or pole shoes, can be used in the case of the pole shanks provided with coils from the inside.

For magnetic reasons, including to minimize the stray flux, only some of the sheet-metal laminates have a magnetically conducting connection of the pole shoes. On the other hand, some of the sheet-metal laminates having pole shoes which are not magnetically connected, include such an optimized slot opening between the pole shoes as to avoid virtually any saturation effects of the poles. The slanting of the axially running slots of the laminated core of the stator further brings about a reduction in the slot engaging moments. Furthermore, the additional mechanical and magnetic loads of the individual poles during the operation of the motor can be permanently fixed in their position by the connecting webs between the poles of a sheet-metal laminate of this type.

The number of indentations per sheet-metal laminate allows an optimum alignment of the overall laminated core to be achieved along with mutual angular positioning of the individual sheet-metal laminates. There are in this case preferably two indentations, since further indentations are statically excessive and counterproductive to an optimum alignment and mutual angular positioning of the sheet-metal laminates.

No reworking of the stator bore is necessary as a result of the modular construction of the laminated core. This dispenses with the need for a machining step which, in the form of a metal-cutting operation, entails the risk of producing metal chips in the laminated core. To remove such metal chips from the laminated core is also complicated and time-consuming, so that there is always the risk of the operation of the electric motor being adversely affected.

In a further embodiment, the sheet-metal laminates of a first layer of the laminated core of a stator have no indentations, and the sheet-metal laminates of a final layer of the laminated core of the stator have no protrusions, so that no design constraints are necessary, for example when attaching a fan or a brake in this area, to realize optimum properties of the electric motor in a compact construction.

In a further preferred embodiment, the laminated core is fitted into a magnetic yoke. Hereby, all positive, nonpositive and material-interconnecting types of connection or combinations thereof are possible. If the sheet-metal laminate of the connected poles has the connection of these poles on the outer circumference, motors without housings can also be preferably realized in this way. Cooling devices for the operation of the electric motor are provided both in the magnetic yoke and for the sheet-metal laminates themselves. These devices are preferably cooling channels and/or measures for enlarging the surface area of the laminated core.

In a further embodiment, the laminated cores are subdivided into axial cores and/or cores resembling segments of a circle. This simplifies the production specifically of large electric motors.

BRIEF DESCRIPTION OF THE DRAWING

The invention and further advantageous refinements of the invention according to features of the subclaims are explained in more detail below with reference to schematically represented exemplary embodiments in the drawing, in which:

FIG. 1 shows a cross section of an interconnected star-shaped laminated core section of a stator;

FIG. 1a is a sectional cutaway view of a sheet-metal laminate of the laminated core;

DETAILED DESCRIPTION OF PREFERRED EMBODIMENTS

Figure 1B:
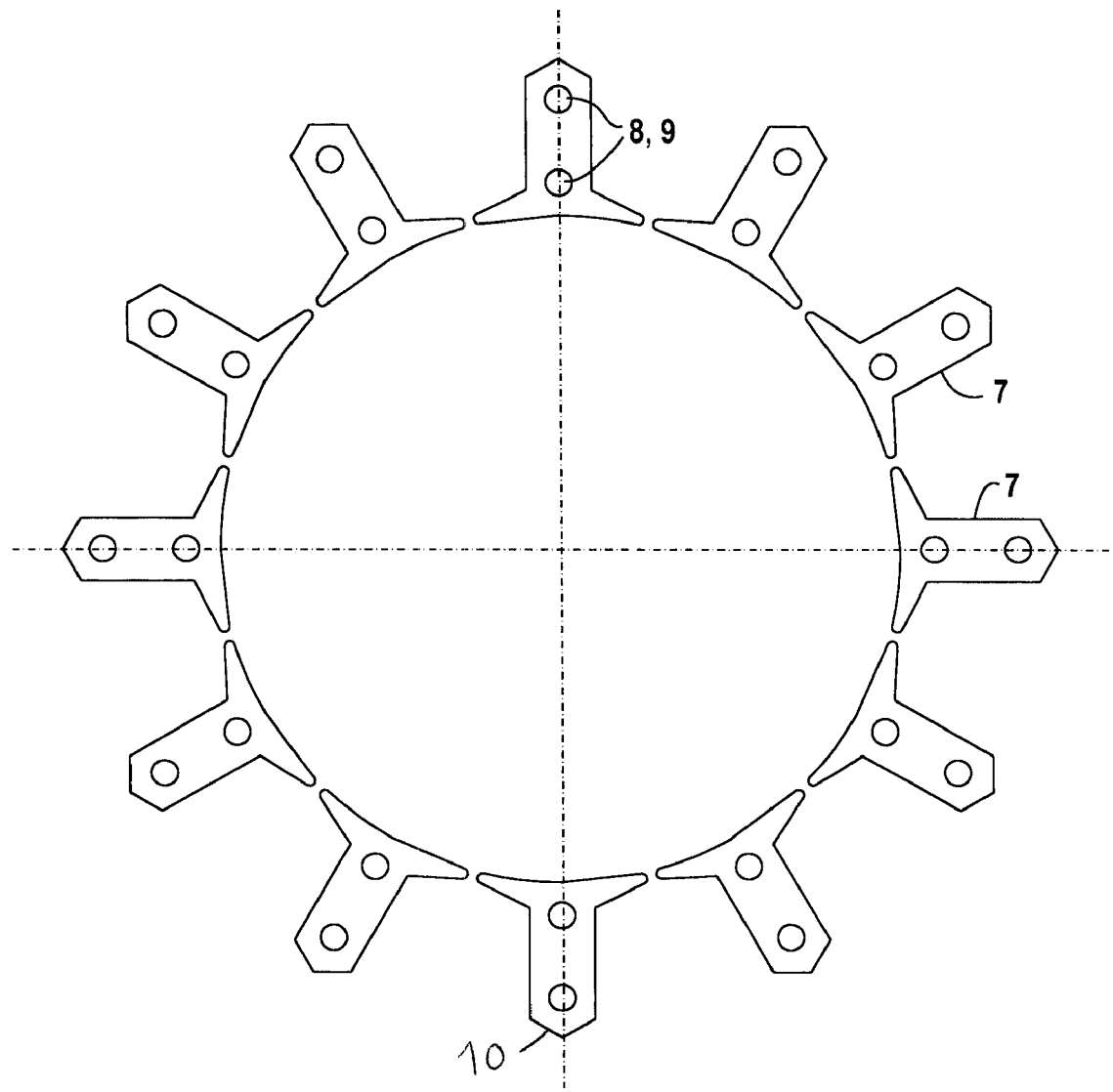
FIG. 1b shows a cross section of a separately formed individual laminated core section of a stator.

FIG. 1 shows a cross section of a symmetrical star-shaped laminated core 1 of a stator. A sheet-metal laminate 6 has poles 2 which are arranged in the shape of a star and connected at their pole shoes 3 in the circumferential direction by webs 4 and thereby terminate with the pole shoes 3 flush with respect to a side facing the rotor. It is also conceivable to arrange the webs 4 radially further outward, so that slot opening extensions face the rotor. Also, the webs are made of a material which, preferably, corresponds to the material of the pole shoes 3.

FIG. 1b depicts individual poles 7 that can also be connected by magnetic or non-magnetic clamps.

In the outward direction, pole shanks 5 are preferably formed in a roof-shaped form 10, to thereby permit and facilitate a process of heat shrinkage into a magnetic yoke, as indicated schematically in FIG. 1 by reference numeral 11 and thereby prevent twisting of the star-shaped laminated core 1 of the stator. For shrink or press fits, the pole shanks 5 are shaped radially outward in such a way that a positive connection with the magnetic yoke is produced. For securement of the star-shaped laminated core 1 of a stator, a turning snap-in connection of the star-shaped laminated core 1 in the magnetic yoke 11 is also possible. In this case, the outer sides of the pole shanks 5 are preferably designed such that they are slightly convex, preferably in the form of an arc of a circle, so that, as a result of this connection, the magnetic yoke is deformed only in the elastic range. As is further shown in FIG. 1, the pole shanks 5 may be provided with any suitable type of winding 12. The windings 12 may be fixed by encapsulating and impregnating the laminated core. In this way, not only the mechanical fixing and compacting of the laminated core is achieved but also an electrical insulation of the windings 12 from one another.

The provision of sheet-metal laminates 6, which are connected in the circumferential direction at the pole shoes 3, realizes a preliminary alignment of the individual poles 7, respectively located axially in-between, on the mounting mandrel. By interposing such in the circumferential direction by sheet-metal laminates 6 with connected pole shoes 3, an intermediate alignment can be achieved in the laminated core 1 of a stator at predeterminable intervals, so that the overall alignment of the laminated core 1 is optimized. Fixing of the sheet-metal laminates 6 of the laminated core 1 takes place by casting and/or impregnation.

FIGS. 1 and 1a also show the preferably circular-like indentations 8 and protrusions 9 on a sheet-metal laminate 6 with connected pole shoes 3.

Figure 2:
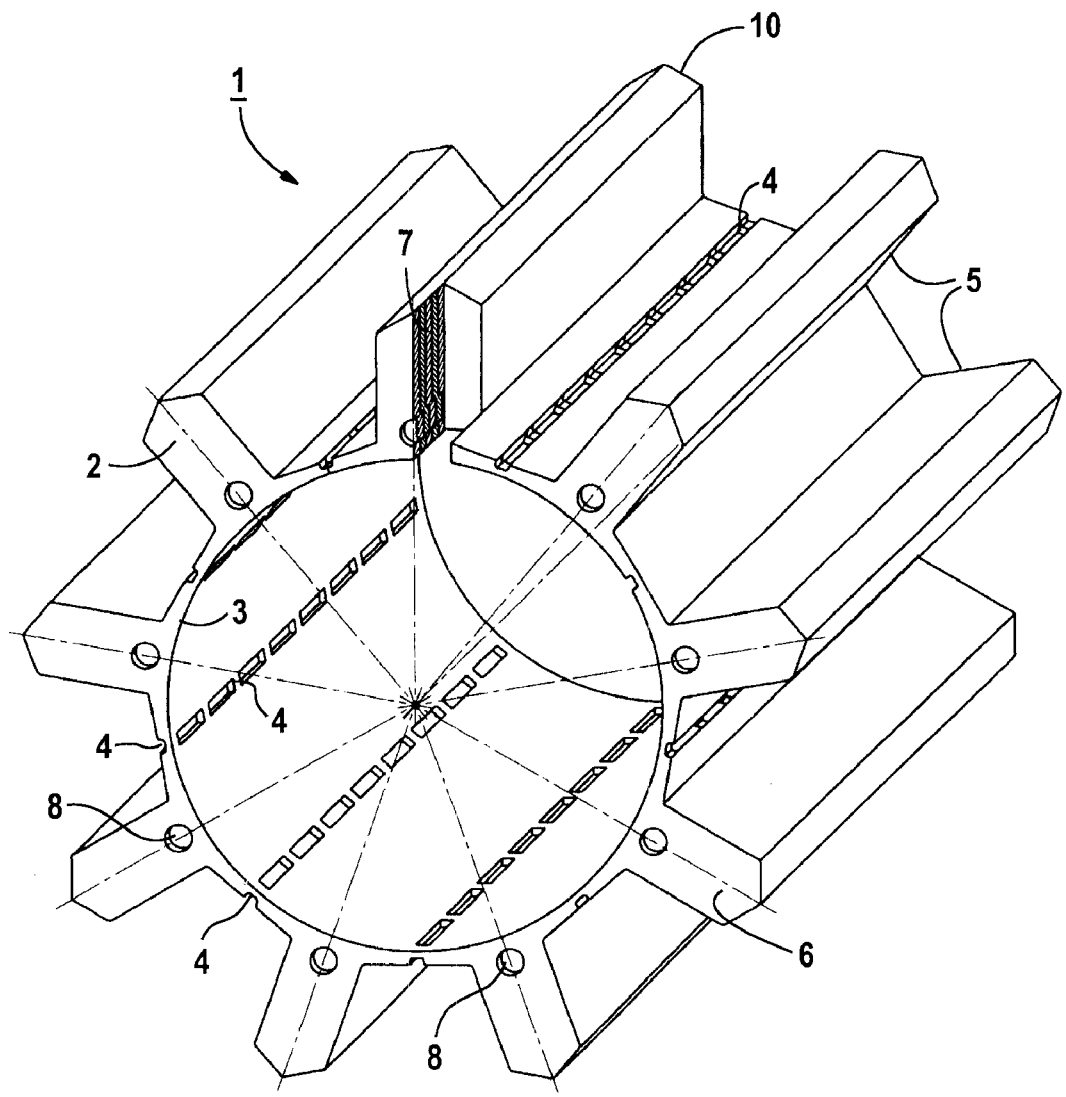
FIG. 2 shows a perspective representation of a star-shaped laminated core of a stator.

FIG. 2 shows in a perspective representation of the laminated core 1 of the stator with star-shaped lamination of the sheet-metal laminates 6. Hereby, the lamination can be seen in a partial section of some of the sheet-metal laminates 6 arranged in a star-shaped manner. The indentations 8 and protrusions 9 of individual sheet-metal laminates 6 engage in one another, so that a closely packed, radially immovable laminated core 1 of the stator is produced, as shown in FIG. 1a. Further consolidation of the laminated core 1 is produced by inserting individual sheet-metal laminates 6 with connected pole shoes 3. An additional securement is realized by casting and/or impregnating the laminated core 1.

In principle, the lamination is configured as follows: on the end faces of the laminated core 1 of a stator there is respectively in the circumferential direction of the stator a sheet-metal laminate 6 with poles 2 with connected pole shoes 3. In between there are sheet-metal laminates 6 of individual poles 7, which are stiffened at a predeterminable axial interval of preferably five metal sheets by a sheet-metal laminate 6 which has radially connected pole shoes 3. For each pole 2, 7, a plurality of indentations 8 or an alternating succession of indentations 8 and protrusions 9 on each side are also possible to thereby fix the laminated core 1 of the stator radially. The geometrical form of the indentations 8 and of the protrusions 9 is in this case of secondary technical significance and depends, i.a., on commercial and technical aspects of the production method. Other connections of the sheet-metal laminates 6, such as for example hook-like connections, are also possible.

Figure 3:
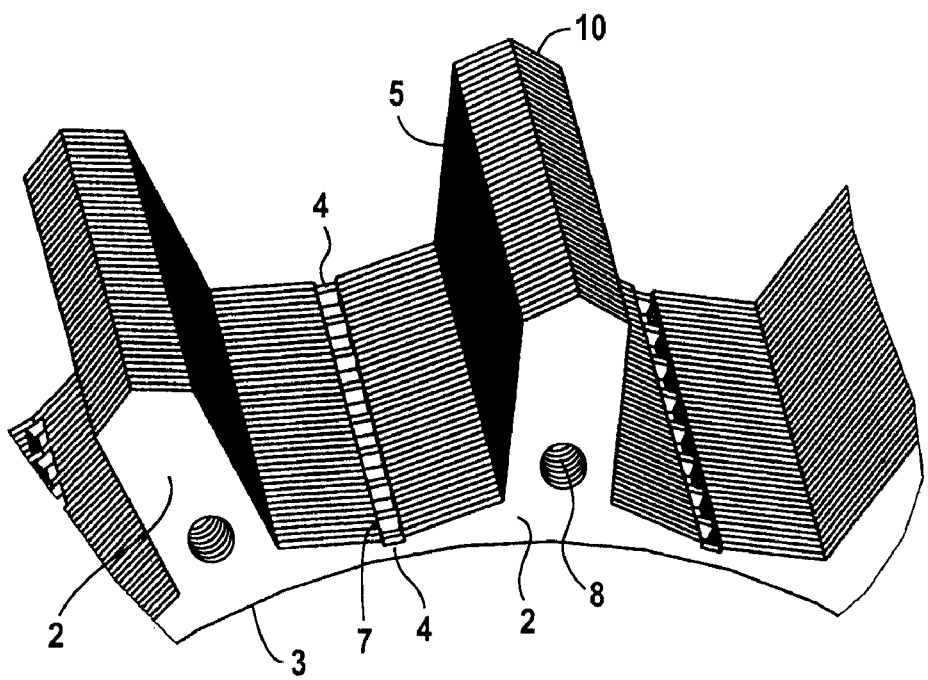
FIG. 3 shows a perspective partial view of the laminated core.

FIG. 3 shows by way of a perspective partial view of the laminated core 1 of the stator the lamination of a laminated core 1 of this type more precisely, with the alternating succession of the different sheet-metal laminates 6, i.e. poles 2 with webs 4 and individual poles 7, being clearly evident.

Figure 4:
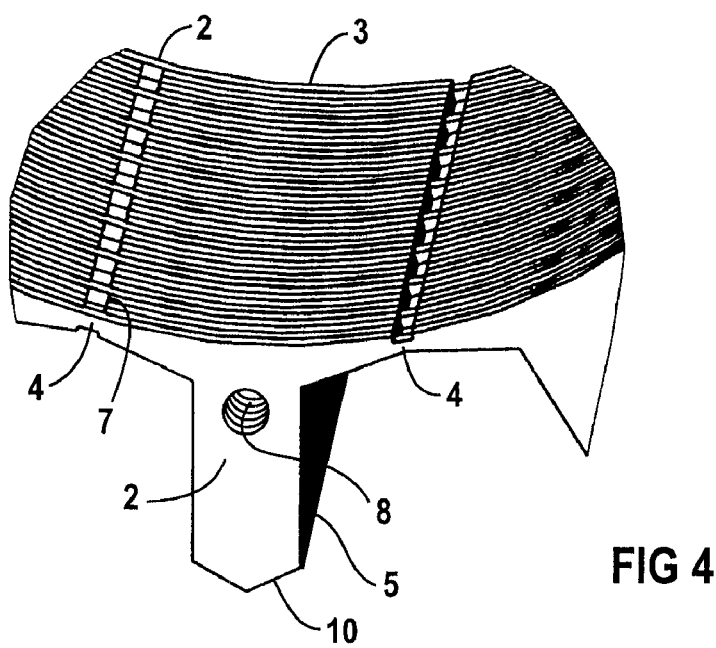
FIG. 4 shows a further perspective partial view of the laminated core.

FIG. 4 shows, by way of a further perspective partial view of the laminated core 1 of the stator, the design of the webs 4 from the viewpoint of the stator bore. Thus, connections of the pole shoes 3 are possible that allow the webs 4 to be set back radially outward with respect to the stator bore, as well as include a flush termination with the stator bore. Depending on the method of assembly, one or the other possible way of providing the connections of the pole shoes 3 can be selected.

What is claimed is:
1. An electric motor, comprising:
 a stator defining an axis and including a first set of sheet-metal laminates, each said sheet-metal laminate having a plurality of poles which include at least one radially extending pole shank terminating in a rotor- facing pole shoe, wherein the poles are interconnected by webs extending in a circumferential direction, and a second set of sheet-metal laminates having separately-formed individual poles which include at least one radially extending pole shank terminating in a rotor-facing pole shoe, wherein the sheet-metal laminates of the first and the second set of sheet-metal laminates is formed with a protrusion and an indentation located on the poles, which protrusion and indentation are so disposed that confronting sheet-metal laminates interlock through engagement of a protrusion of one sheet-metal laminate in an indentation of the other sheet-metal laminate, when a predetermined number of sheet-metal laminates of the first set and a predetermined number of sheet-metal laminates of the second set are alternatingly laminated in the direction of the stator axis to form a laminated stator core.

2. The electric motor of claim 1, and further comprising a winding surrounding the pole shanks of the first and second set of stacked sheet-metal laminates.

3. The electric motor of claim 1, wherein, as viewed in axial direction, at least a first one of the sheet-metal laminates and at least a last one of the sheet-metal laminates of the laminated core of the stator are selected from the first set of sheet-metal laminates.

4. The electric motor of claim 1, and further comprising an external magnetic yoke for insertion of the laminated core.

5. The electric motor of claim 4, wherein the pole shanks are fixed in the magnetic yoke by a connection that is at least one of a positively locking, force-transmitting, and material-interconnecting connection.

6. A method of producing a stator for an electric motor, comprising the following steps:

making by stamping in a progressive die a first set of sheet-metal laminates having interconnected poles and a second set of sheet-metal laminates defining separately-formed individual poles;

forming on the interconnected poles and the separately-formed individual poles a protrusion and an indentation;

laminating a predetermined number of sheet metal laminates of the first set and a predetermined number of sheet metal laminates of the second set alternatingly in an axial direction, with a protrusion of a pole of each sheet metal laminate engaging with a protrusion of a pole of an adjacent sheet metal laminate, to form a laminated stator core;

attaching pre-wound coils to pole shanks of the poles of the laminated stator core; and subjecting the laminated stator core to at least one process selected from the group consisting of a casting process and an impregnation process.

7. The method of claim 6, and further comprising the step of inserting the laminated core into a magnetic yoke.

* * * * *

UNITED STATES PATENT AND TRADEMARK OFFICE
CERTIFICATE OF CORRECTION

PATENT NO.    : 6,483,221 B1
DATED         : November 19, 2002
INVENTOR(S)   : Jürgen Pawellek, Udo Schulz and Rolf Vollmer It is certified that error appears in the above-identified patent and that said Letters Patent is hereby corrected as shown below:

<u>Title page,</u>
Item [30], Foreign Application Priority Data, insert
-- 198 42 948    09-18-1998    Germany --

Signed and Sealed this

Thirty-first Day of December, 2002

JAMES E. ROGAN
*Director of the United States Patent and Trademark Office*